(12) United States Patent
Tanabe et al.

(10) Patent No.: US 10,309,479 B2
(45) Date of Patent: Jun. 4, 2019

(54) CYLINDER DEVICE

(71) Applicant: Hitachi Automotive Systems, Ltd., Ibaraki (JP)

(72) Inventors: Umi Tanabe, Ibaraki (JP); Yusei Kimura, Ibaraki (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 0 days.

(21) Appl. No.: 15/562,310

(22) PCT Filed: Sep. 26, 2016

(86) PCT No.: PCT/JP2016/078153
§ 371 (c)(1),
(2) Date: Sep. 27, 2017

(87) PCT Pub. No.: WO2017/057213
PCT Pub. Date: Apr. 6, 2017

(65) Prior Publication Data
US 2018/0051767 A1  Feb. 22, 2018

(30) Foreign Application Priority Data

Sep. 30, 2015 (JP) .................................. 2015-192849

(51) Int. Cl.
*F16F 9/53* (2006.01)
*F16F 9/36* (2006.01)
(Continued)

(52) U.S. Cl.
CPC .............. *F16F 9/36* (2013.01); *F16F 9/3235* (2013.01); *F16F 9/3242* (2013.01); *F16F 9/46* (2013.01);
(Continued)

(58) Field of Classification Search
CPC .... F16F 9/34; F16F 9/364; F16F 9/512; F16F 9/532
(Continued)

(56) References Cited

U.S. PATENT DOCUMENTS

| 3,321,210 | A | * | 5/1967 | Delchev | .................... | F16F 9/34 |
| | | | | | | 188/282.4 |
| 4,441,593 | A | * | 4/1984 | Axthammer | ......... | B60G 15/062 |
| | | | | | | 188/322.19 |
| 4,445,598 | A | * | 5/1984 | Brambilla | ............... | F16F 9/364 |
| | | | | | | 188/315 |
| 4,485,899 | A | * | 12/1984 | Grundei | .................. | F16F 9/062 |
| | | | | | | 188/277 |

(Continued)

FOREIGN PATENT DOCUMENTS

| JP | 06-010984 A | 1/1994 |
| JP | 10-110768 A | 4/1998 |

(Continued)

OTHER PUBLICATIONS

International Search Report dated Nov. 1, 2016 for WO 2017/057213 A1.

*Primary Examiner* — Christopher P Schwartz
(74) *Attorney, Agent, or Firm* — Abelman, Frayne & Schwab

(57) ABSTRACT

A cylinder device includes: an inner cylinder in which a functional fluid, a fluid property of which is changed due to an electric field or a magnetic field, is encapsulated; an outer cylinder provided outside the inner cylinder; an intermediate cylinder provided between the inner cylinder and the outer cylinder to serve as an electrode or a magnetic pole; a rod guide provided to close the one end side end portions of the inner cylinder and the outer cylinder; a spacer having one end located at the rod guide side and the other end located at the one end side of the intermediate cylinder, and fitted to the inner cylinder; and an elastic seal member disposed in a portion of the other end of the spacer, and configured to seal (Continued)

the one end side end portion of the passage between the intermediate cylinder and the inner cylinder.

7 Claims, 4 Drawing Sheets

(51) Int. Cl.
    *F16F 9/46*     (2006.01)
    *F16F 9/32*     (2006.01)

(52) U.S. Cl.
    CPC ............... *F16F 9/53* (2013.01); *F16F 9/532* (2013.01); *F16F 2230/30* (2013.01)

(58) Field of Classification Search
    USPC .................... 188/266, 267, 267.1, 267.2, 188/322.16–322.19
    See application file for complete search history.

(56) References Cited

U.S. PATENT DOCUMENTS

| | | | | |
|---|---|---|---|---|
| 4,589,528 A | * | 5/1986 | Axthammer | F16F 9/466 188/266.2 |
| 4,724,938 A | * | 2/1988 | Horvath | F16F 9/364 188/322.17 |
| 4,819,772 A | * | 4/1989 | Rubel | F16F 9/532 188/266.8 |
| 5,259,487 A | * | 11/1993 | Petek | F16F 9/532 188/267.1 |
| 5,353,897 A | * | 10/1994 | Woessner | F16F 9/512 188/267 |
| 5,477,946 A | * | 12/1995 | Kawamata | F16F 9/103 188/267.1 |

FOREIGN PATENT DOCUMENTS

| | | |
|---|---|---|
| JP | 2013-204799 A | 10/2013 |
| WO | 2014-135183 A | 9/2014 |

* cited by examiner

CYLINDER DEVICE

CROSS REFERENCE TO RELATED APPLICATIONS

This application is a national phase of PCT application No. PCT/JP2016/078153, filed on 26 Sep. 2016, which claims priority from Japanese patent application No. 2015-192849, filed on 30 Sep. 2015, all of which are incorporated herein by reference.

TECHNICAL FIELD

The present invention relates to a cylinder device that is properly used for buffering a vibration of a vehicle such as, for example an automobile.

BACKGROUND

In general, in a vehicle such as an automobile, a cylinder device represented by a hydraulic shock absorber is provided between a vehicle body (sprung) side and each vehicle wheel (unsprung) side. Here, there has been known a configuration in which an intermediate cylinder is provided between an inner cylinder and an outer cylinder of a cylinder device, and a working fluid (for example, an electrorheological fluid) is caused to flow through a gap between the inner cylinder and the intermediate cylinder (see, for example, Patent Document 1). The inner cylinder is fixed between a rod guide and a base member with an axial fastening force. The intermediate cylinder extends between the rod guide and the base member in the axial direction while surrounding the inner cylinder from the radial outside. A spacer made of, for example, an insulating material is provided between the intermediate cylinder and the rod guide.

PRIOR ART DOCUMENT

Patent Document

Patent Document 1: International Publication No. WO 2014/135183

DISCLOSURE OF THE INVENTION

Problems to be Solved

However, in a related technology disclosed in Patent Document 1, in order to give an axial fastening force, that is, an axial force to the inner cylinder and the intermediate cylinder between the rod guide and the base member, it is required to strictly manage a dimensional tolerance in the axial direction in each of the inner cylinder and the intermediate cylinder and it becomes difficult to manage a dimension. Thus, when an attempt is made to position only the inner cylinder between the rod guide and the base member in the axial direction, there is a possibility that the positionability of the intermediate cylinder may be reduced, and the intermediate cylinder may be loosened or misaligned in the axial direction due to a vibration or the like from the outside. There is a possibility that the working fluid within the intermediate cylinder may be leaked.

An object of the present invention is to provide a cylinder device in which an inner cylinder and an intermediate cylinder may be stably mounted, and the leakage of a fluid may be suppressed.

Means to Solve the Problems

The cylinder device according to an exemplary embodiment of the present invention includes: an inner cylinder in which a functional fluid, a fluid property of which is changed due to an electric field or a magnetic field, is encapsulated, and into which a rod is inserted; an outer cylinder provided outside the inner cylinder; an intermediate cylinder provided between the inner cylinder and the outer cylinder such that a passage in which the functional fluid flows from one end side of the cylinder device toward the other end side in an axial direction due to advancing and retracting movements of the rod is formed between the inner cylinder and the intermediate cylinder, and configured to serve as an electrode or a magnetic pole; a rod guide provided to close the one end side end portions of the inner cylinder and the outer cylinder, and configured to support the rod; a spacer having one end located at the rod guide side and the other end located at the one end side of the intermediate cylinder, and fitted to the inner cylinder; and an elastic seal member disposed in a portion of the other end of the spacer, and configured to seal the one end side end portion of the passage between the intermediate cylinder and the inner cylinder.

According to the cylinder device in the exemplary embodiment of the present invention, it is possible to stably mount an inner cylinder and an intermediate cylinder to a rod guide, and to suppress the leakage of a fluid by a seal member.

DETAILED DESCRIPTION TO EXECUTE THE INVENTION

Hereinafter, descriptions will be made on a case where a cylinder device according to an exemplary embodiment of the present invention is employed in a shock absorber provided in a vehicle such as a four-wheeled vehicle, as an example, with reference to accompanying drawings.

Figure 1:
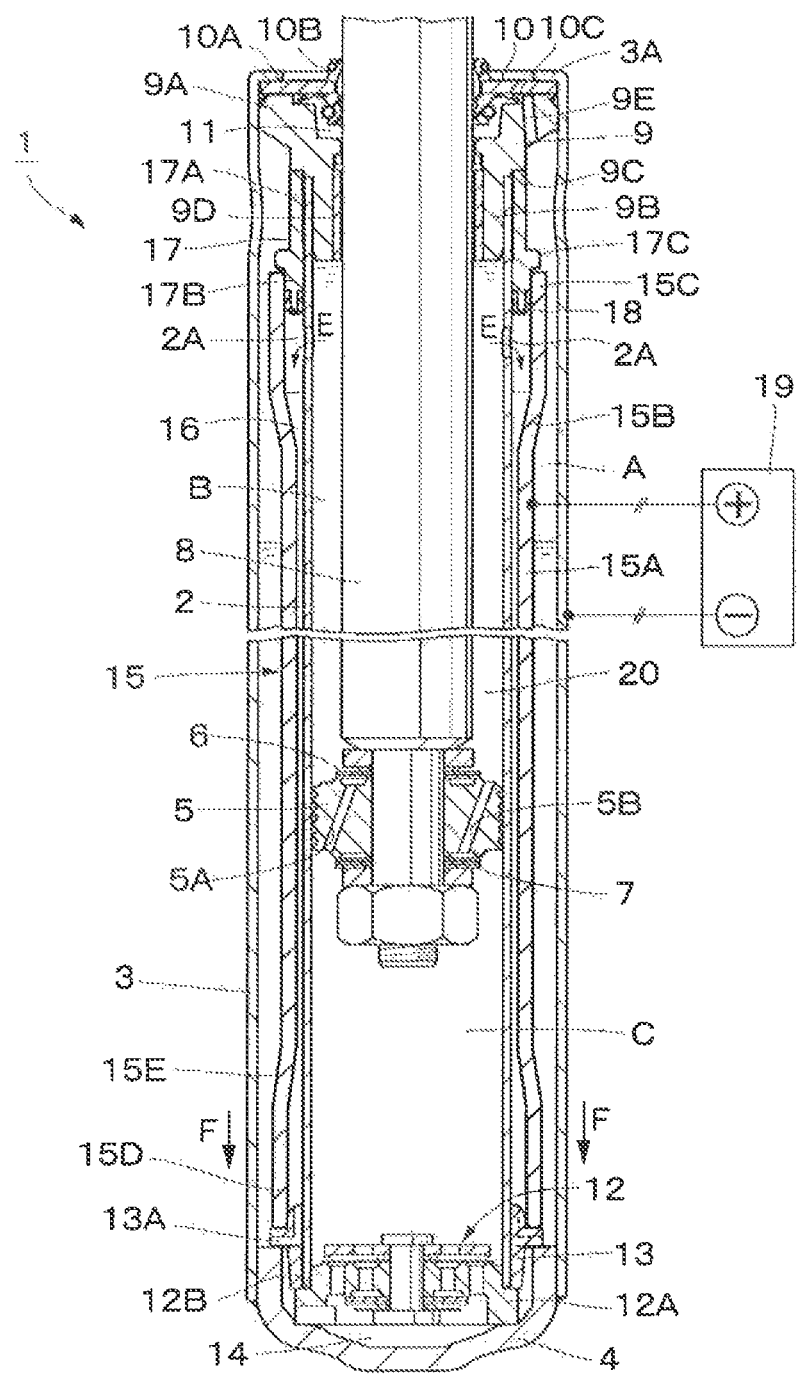
FIG. 1 is a cross-sectional view illustrating a shock absorber as a cylinder device according to a first exemplary embodiment.
Figure 2:
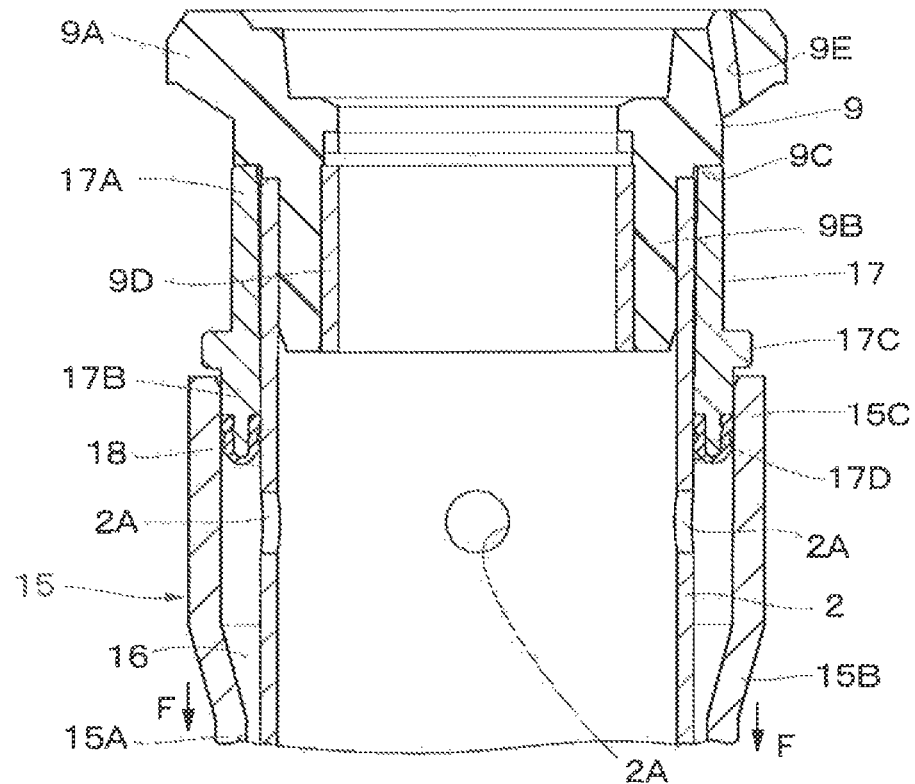
FIG. 2 is a sectional view illustrating a mounting portion of a rod guide, an inner cylinder, and an intermediate cylinder in a state where a piston rod, a rod seal, and the like in FIG. 1 are removed, in an enlarged state.
Figure 3:
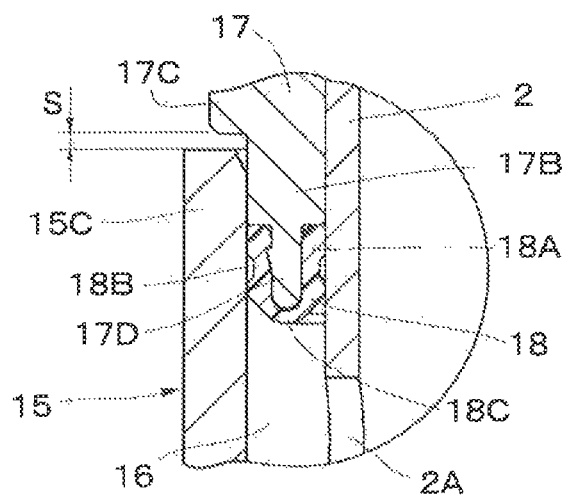
FIG. 3 is a sectional view illustrating a seal member, a lower end side of a spacer, and the like in FIG. 2, in an enlarged state.

Here, FIGS. 1 to 3 illustrate a shock absorber as a cylinder device according to a first exemplary embodiment of the present invention. A shock absorber 1 is configured as a damping force regulation-type hydraulic shock absorber (a semi-active damper) that uses a functional fluid (i.e., an electrorheological fluid) as a working fluid 20 such as a working oil to be encapsulated therein. The shock absorber 1, together with a suspension spring (not illustrated) composed of, for example, a coil spring, constitutes a suspension device for a vehicle. In the following description, it is assumed that one end side of the shock absorber 1 in the axial direction is described as an "upper end" side, and the other end side in the axial direction is described as a "lower end" side.

The shock absorber 1 is configured to include an inner cylinder 2, an outer cylinder 3, a piston 5, a piston rod 8, a rod guide 9, an intermediate cylinder 15, etc. The inner cylinder 2 is formed as a cylinder body of a cylindrical shape extending in the axial direction, and has a working fluid 20 (i.e., a functional fluid) (to be described below) encapsulated therein. The piston rod 8 to be described below is inserted into the inner cylinder 2, and the outer cylinder 3 is coaxially disposed outside the inner cylinder 2.

The outer cylinder 3 constitutes an outer shell of the shock absorber 1, and is formed as a cylindrical body. The lower end side of the outer cylinder 3 is formed as a closed end closed by a bottom cap 4 through a welding processing or the like. The bottom cap 4 constitutes a base member together with a valve body 12A of a bottom valve 12 to be described below. The upper end side of the outer cylinder 3 is formed as an opening end, and a caulking portion 3A is formed at the opening end side to be bent inward in the radial direction. The caulking portion 3A holds an outer periphery side of an annular plate body 10A of a rod seal 10 to be described below, in a locked state.

The inner cylinder 2 is provided within the outer cylinder 3 coaxially with the outer cylinder 3. The lower end side of the inner cylinder 2 is fitted and mounted to the valve body 12A of the bottom valve 12, and the upper end side is fitted and mounted to the rod guide 9. The inner cylinder 2 constitutes a cylinder together with the outer cylinder 3, and a working fluid 20 is encapsulated in the cylinder. An oil hole 2A, which always communicates with a passage 16 to be described below, is formed as a lateral hole in the radial direction in the inner cylinder 2, and a rod side oil chamber B within the inner cylinder 2 communicates with the passage 16 to be described below through the oil hole 2A.

An annular reservoir chamber A is formed between the inner cylinder 2 and the outer cylinder 3. A gas is encapsulated within the reservoir chamber A, together with the working fluid 20. The gas may be air in an atmospheric pressure state, or a gas such as a compressed nitrogen gas may be used. The gas within the reservoir chamber A is compressed to compensate for an entry volume of the piston rod 8 when the piston rod 8 is retracted (a retraction stroke).

The piston 5 is slidably fitted (inserted) into the inner cylinder 2. The piston 5 defines the interior of the inner cylinder 2 as two chambers, that is, the rod side oil chamber B and a bottom side oil chamber C. A plurality of oil passages 5A and a plurality of oil passages 5B which allow the rod side oil chamber B to communicate with the bottom side oil chamber C are formed to be spaced apart from each other, in the circumferential direction in the piston 5. Here, the shock absorber 1 according to the exemplary embodiment is formed as a uniflow structure. Thus, the working fluid 20 within the inner cylinder 2 always flows m one direction (i.e., in the arrow E direction in FIG. 1) from the rod side oil chamber B (i.e., the oil hole 2A of the inner cylinder 2) toward the passage 16 to be described below at both the retraction stroke and the extension stroke of the piston rod 8.

In order to implement such a uniflow structure, a retraction side check valve 6 is provided at the upper end face of the piston 5, which is opened when the piston 5 is displaced downward in a sliding manner in the inner cylinder 2 at the retraction stroke of the piston rod 8, and is closed in other cases. The retraction side check valve 6 is configured to allow the oil liquid (the working fluid 20) within the bottom side oil chamber C to flow toward the rod side oil chamber B through the inside of each of the oil passages 5A, and to prevent the flow of the oil liquid in the direction opposite to this.

A disk valve 7 is provided at the lower end face of the piston 5, as, for example, an extension side damping force generating mechanism. The extension side disk valve 7 is opened in the case where the pressure within the rod side oil chamber B exceeds a predetermined relief setting pressure when the piston 5 is displaced upward in a sliding manner within the inner cylinder 2 at the extension stroke of the piston rod 8. The pressure at this time is relieved to the bottom side oil chamber C side through each of the oil passages 5B.

The piston rod 8 as a rod extends within the inner cylinder 2 to be displaceable in the axial direction. The lower end side of the piston rod 8 is connected (fixed) to the piston 5 within the inner cylinder 2, and the upper end side extends to the outside of the inner cylinder 2 and the outer cylinder 3 constituting a cylinder. In this case, the upper end side of the piston rod 8, which is one end side, protrudes to the outside of the outer cylinder 3 through the rod guide 9.

The rod guide 9 is fitted to close the upper end sides of the inner cylinder 2 and the outer cylinder 3. The rod guide 9 is formed as a cylinder body in a predetermined shape by performing a molding process, a cutting process, or the like on, for example, a metal material, a hard resin material or the like. As illustrated in FIGS. 1 and 2, the rod guide 9 is formed in a stepped cylindrical shape by an annular large diameter portion 9A that is located at the upper side and inserted in the inner periphery side of the outer cylinder 3, a short cylindrical small diameter portion 9B that is located below the large diameter portion 9A and inserted in the inner periphery side of the inner cylinder 2, and an annular step 9C that is provided at the outer periphery side at a location between the small diameter portion 9B and the large diameter portion 9A, and to be fitted with a spacer 17 to be described below.

A guide portion 9D is provided at the inner periphery side of the small diameter portion 9B of the rod guide 9 to slidably guide the piston rod 8 in the axial direction. The guide portion 9D is formed by performing a tetrafluoroethylene coating on, for example, the inner peripheral surface of the metal cylinder. Communication passages 9E are provided at a plurality of positions (for example, three positions) spaced apart from each other in the circumferential direction in the large diameter portion 9A of the rod guide 9. Each of the communication passages 9E is a passage that allows an oil storage chamber 11 (to be described below) to communicate with the reservoir chamber A through a check valve body 10C. The rod guide 9 configured as described above is mounted by press-fitting the large diameter portion 9A to the inner periphery side of the outer cylinder 3, and press-fitting the small diameter portion 9B to the inner periphery side of the inner cylinder 2. In this state, the rod guide 9 slidably guides the piston rod 8 in the axial direction by the guide portion 9D provided at the inner periphery side, and supports the piston rod 8.

The annular rod seal 10 is provided between the caulking portion 3A of the outer cylinder 3 and the large diameter portion 9A of the rod guide 9. The rod seal 10 is configured to include the metallic annular plate body 10A having an inner periphery side serving as an insertion hole of the piston rod 8, an elastic seal portion 10B made of an elastic material such as rubber, that is fixed to the annular plate body 10A through a processing such as baking, and the check valve body 10C that is formed at the lower face side of the annular plate body 10A to be elastically deformable. The rod seal 10 liquid-tightly and air-tightly seals (seals) a gap between the outer cylinder 3 and the piston rod 8 while the inner periphery of the elastic seal portion 10B slides in contact with the outer periphery side of the piston rod 8.

The oil storage chamber 11 is provided between the large diameter portion 9A of the rod guide 9 and the rod seal 10. The oil storage chamber 11 is formed as an annular space portion surrounded by the piston rod 8, the large diameter portion 9A of the rod guide 9, the elastic seal portion 10B of the rod seal 10, and the like. Then, the oil storage chamber 1 temporarily stores the leaking oil or the like when a working oil within the rod side oil chamber B or a gas mixed in the oil leaks through a slight gap between the piston rod 8 and the guide portion 9D or the like.

The check valve body 10C of the rod seal 10 is disposed between the oil storage chamber 11 and the reservoir chamber A. The check valve body 10C allows the flow of the leaking oil within the oil storage chamber 11 into the reservoir chamber A through each of the communication passages 9E of the rod guide 9, and prevents the flow in the opposite direction. Accordingly, the check valve body 10C prevents a gas and a working oil within the reservoir chamber A from flowing back to the oil storage chamber 11 side.

The bottom valve 12 is provided at the lower end side of the inner cylinder 2 such that the bottom valve 12 is located between the inner cylinder 2 and the bottom cap 4. The bottom valve 12 includes the valve body 12A fixedly provided on the inner surface (the upper surface) of the bottom cap 4, an extension side/retraction side valve member provided in the valve body 12A, and the like. The valve body 12A defines the reservoir chamber A and the bottom side oil chamber C, between the lower end side of the inner cylinder 2 and the bottom cap 4. In the valve body 12A, oil passages, each of which allows the reservoir chamber A to communicate with the bottom side oil chamber C through the valve members, are formed at intervals in the circumferential direction.

An annular step portion 12B is formed at the outer periphery side of the valve body 12A, as illustrated in FIG. 1, and the lower end inner periphery side of the inner cylinder 2 is fixedly fitted to the step portion 12B. An annular holding member 13 is fitted and mounted to the outer periphery side of the inner cylinder 2, at the step portion 12B. The holding member 13 holds the lower end side of the intermediate cylinder 15 to be described below in a positioned state in the radial direction and the axial direction. The holding member 13 is made of, for example, an electrically insulating material, and maintains an electrically insulated state between the inner cylinder 2, the bottom cap 4, the valve body 12A, and the intermediate cylinder 15. A plurality of oil passages 13A are formed in the holding member 13 to cause the passage 16 to be described below to communicate with the reservoir chamber A.

An oil passage 14 is provided between the valve body 12A of the bottom valve 12 and the bottom cap 4 to communicate with the reservoir chamber A. The oil passage 14 also communicates with the passage 16 within the intermediate cylinder 15 through each of the oil passages 13A of the holding member 13. The oil passage 14 is disposed between the bottom side oil chamber C within the inner cylinder 2 and the reservoir chamber A, and the communication and interruption between both sides are allowed by the bottom valve 12.

The intermediate cylinder 15 extending in the axial direction and composed of a pressure pipe is disposed between the inner cylinder 2 and the outer cylinder 3. The intermediate cylinder 15 is made of a conductive material and constitutes a cylindrical electrode. The intermediate cylinder 15 is configured to include a cylinder portion 15A extending in the axial direction coaxially with the inner cylinder 2 and formed to have a diameter slightly larger than the outer diameter of the inner cylinder 2 by a predetermined dimension, an upper diameter-enlarged cylinder portion 15C formed integrally with the upper end side of the cylinder portion 15A and having a diameter enlarged radially outward via a tapered inclined cylinder portion 15B, and a lower diameter-enlarged cylinder portion 15D formed integrally with the lower end side of the cylinder portion 15A similarly. The lower diameter-enlarged cylinder portion 15D has a diameter that is enlarged radially outward from the lower end side of the cylinder portion 15A via a tapered inclined cylinder portion 15E.

In the inclined cylinder portion 15B of the intermediate cylinder 15, an annular stepped portion is configured to be located between the cylinder portion 15A and the diameter-enlarged cylinder portion 15C. That is, the upper diameter-enlarged cylinder portion 15C has a diameter that is enlarged radially outward from the upper end side of the cylinder portion 15A via the annular stepped portion (the tapered inclined cylinder portion 15B). The upper end inner periphery side of the diameter-enlarged cylinder portion 15C is fitted to a lower cylinder portion 17B of the spacer 17 to be described below.

The upper end side (the diameter-enlarged cylinder portion 5C) of the intermediate cylinder 15 is positioned at the annular step 9C of the rod guide 9 via the spacer 17, and the diameter-enlarged cylinder portion 15D at the lower end side is positioned at the step portion 12B of the valve body 12A via the holding member 13. Within the intermediate cylinder 15 (i.e., a gap with the inner cylinder 2), the annular passage 16 is formed to extend so as to surround the outer periphery side of the inner cylinder 2 over the entire circumference. The passage 16 always communicates with the rod side oil chamber B via the oil hole 2A formed in the inner cylinder 2.

Here, the working fluid 20 within the inner cylinder 2 flows into the passage 16 through the oil hole 2A in the arrow E direction from the rod side oil chamber B at both the retraction stroke and extension stroke of the piston rod 8. When the piston rod 8 performs advancing and retracting movements within the inner cylinder 2 (i.e., during repetition of the retraction stroke and the extension stroke), the working fluid 20 that has flowed into the passage 16 flows from the upper end side of the passage 16 toward the lower end side in the axial direction due to the advancing and retracting movements.

The working fluid 20 that has flowed into the passage 16 flows out from the lower end side of the intermediate cylinder 15 to the reservoir chamber A through the oil passages 13A of the holding member 13 or the like. Here, the pressure of the working fluid 20 is the highest at the upstream side of the passage 16 (i.e., at the oil hole 2A side), and gradually decreases since the working fluid 20 receives a flow path (passage) resistance while flowing inside the passage 16. Thus, the working fluid 20 within the passage 16 has a pressure that becomes the lowest when flowing at the downstream side of the passage 16 (i.e., the oil passages 13A of the holding member 13).

The spacer 17 is a mounting member used for positioning the upper end side of the intermediate cylinder 15 (i.e., the diameter-enlarged cylinder portion 15C) with respect to the rod guide 9. The spacer 17 is formed as a short stepped cylinder body by, for example, an electrically insulating material, and includes an upper cylinder portion 17A, the lower cylinder portion 17B, an annular flange portion 17C, and a seal holding portion 17D as described below. The spacer 17 is mounted in a state where the inner periphery side thereof (the inner periphery side of the upper cylinder portion 17A and the lower cylinder portion 17B) is fitted to the upper end side outer periphery of the inner cylinder 2. Here, the upper cylinder portion 17A of the spacer 17 is fitted to the annular step 9C of the rod guide 9, and fixed (positioned) to the annular step 9C in a locked state.

The annular flange portion 17C is provided at the outer periphery side of the spacer 17, at a position below the axial middle portion (between the upper cylinder portion 17A and the lower cylinder portion 17B). The lower cylinder portion 17B located below the flange portion 17C in the spacer 17 is formed to be thicker than the upper cylinder portion 17A (to have a larger radial dimension). At the lower end of the lower cylinder portion 17B, the seal holding portion 17D is provided to protrude downward. The seal holding portion 17D is formed by reducing the thickness at the radial inside and outside of the lower end side portion of the lower cylinder portion 17B of the spacer 17 over the entire circumference and is molded as a cylinder protrusion thinner than the lower cylinder portion 17B. An elastic seal member 18 is mounted and provided in the seal holding portion 17D to seal one end (the upper end side) of the passage 16, between the inner cylinder 2 and the intermediate cylinder 15.

The spacer 17 is formed such that the inner diameter thereof is slightly larger than the outer diameter of the inner cylinder 2, and the outer diameter of the lower cylinder portion 17B is slightly smaller than the inner diameter of the diameter-enlarged cylinder portion 15C of the intermediate cylinder 15. To the outer periphery side of the lower cylinder portion 17B of the spacer 17, the diameter-enlarged cylinder portion 15C of the intermediate cylinder 15 is loosely fitted and mounted. Here, a gap S is formed between the flange portion 17C of the spacer 17 and the upper end of the diameter-enlarged cylinder portion 15C, as illustrated in FIG. 3. Accordingly, the spacer 17 is provided to be relatively movable with respect to the diameter-enlarged cylinder portion 15C of the intermediate cylinder 15 and the inner cylinder 2 within the range of the gap S in the axial direction. That is, at the outer periphery side of the spacer 17, the flange portion 17C is provided at a position not abutting on one end (the upper end of the diameter-enlarged cylinder portion 15C) of the intermediate cylinder 15.

The seal member 18 made of an elastic material includes a first seal portion 18A disposed between the inner cylinder 2 and the seal holding portion 17D of the spacer 17 with a margin to seal a gap between both sides, and a second seal portion 18B disposed between the diameter-enlarged cylinder portion 15C of the intermediate cylinder 15 and the seal holding portion 17D of the spacer 17 with a margin to seal a gap between both sides. As illustrated in FIG. 3, the seal member 18 is formed as a seal having a U-shaped cross-section (for example, a U packing), and the first seal portion 18A and the second seal portion 18B are integrally molded by the U-shaped connecting portion 18C. The seal member 18, together with the spacer 17, suppresses the working fluid within the passage 16 from leaking from the gap between the inner cylinder 2 and the intermediate cylinder 15 to the outside.

The seal member 18 is maintained in a locked state at the lower end side of the lower cylinder portion 17B of the spacer 17 through the seal holding portion 17D. Meanwhile, the lower cylinder portion 17B of the spacer 17 is loosely fitted and mounted between the outer peripheral surface of the inner cylinder 2 and the diameter-enlarged cylinder portion 15C of the intermediate cylinder 15, and the seal portions 18A and 18B of the seal member 18 abut on both fitting portions (i.e., the outer peripheral surface of the inner cylinder 2 and the diameter-enlarged cylinder portion 15C of the intermediate cylinder 15), in an elastically deformed state with a margin. Thus, the seal member 18 in the elastically deformed state may give a pull-out prevention performance and a sealing performance to both fitting portions.

Here, the upper end side of the intermediate cylinder 15 is formed as the diameter-enlarged cylinder portion 15C, the diameter of which is enlarged radially outward via the tapered inclined cylinder portion 15B. Thus, the tapered inclined cylinder portion 15B (i.e., the annular stepped portion) becomes a pressure receiving face that receives a pressure caused by the working fluid 20 within the passage 16, and the intermediate cylinder 15 is pressed downward (the arrow F direction in FIG. 1 and FIG. 2) by the pressure received by the inclined cylinder portion 15B. As a result, the intermediate cylinder 15 is held in a state where the lower diameter-enlarged cylinder portion 15D is pressed downward against the holding member 13 (i.e., the step portion 12B of the valve body 12A).

The lower cylinder portion 17B of the spacer 17 receives a pressure caused by the working fluid 20 within the passage 16 while being interposed between the diameter-enlarged cylinder portion 15C of the intermediate cylinder 15 and the inner cylinder 2. Thus, the spacer 17 is pressed upward by the pressure within the passage 16 and is held while being pressed against the annular step 9C of the rod guide 9 and fitted to the annular step 9C.

The intermediate cylinder 15 is connected to a positive electrode of a battery 19 serving as a power source via, for example, a high voltage driver (not illustrated) generating a high voltage. The intermediate cylinder 15 constitutes an electrode that applies an electric field to the working fluid 20 within the passage 16 (i.e., an electrorheological fluid as a functional fluid). Both end sides of the intermediate cylinder 15 (i.e., the upper and lower diameter-enlarged cylinder portions 15C and 15D) are electrically insulated by the holding member 13 and the spacer 17 which are electrically insulative. Meanwhile, the inner cylinder 2 is connected to a negative electrode (ground) via the rod guide 9, the bottom valve 12, the bottom cap 4, the outer cylinder 3, the high voltage driver, and the like. The annular passage 16 formed between the inner cylinder 2 and the intermediate cylinder 15 imparts a flow resistance to the working fluid 20 (i.e., the electrorheological fluid) that flows within the inner cylinder 2 and the outer cylinder 3 due to the sliding movement of the piston 5, thereby generating a damping force as described below.

Here, the working fluid 20 serving as a working oil employed in the exemplary embodiment is constituted by an electrorheological fluid (ER fluid) as a functional fluid. The flow resistance (the damping force) of the electrorheological fluid changes depending on an applied voltage. Specifically, the electrorheological fluid is constituted by a base oil made of, for example, a silicon oil or the like, and particles (fine particles) mixed in a dispersed state in the base oil and having a viscous resistance that changes depending on a change of an electric field.

The high voltage driver boosts a DC voltage output from the battery 19 based on a command (a high voltage command) output from a controller (not illustrated) that variably regulates the damping force of the shock absorber 1. Then, a high voltage obtained by boosting the DC voltage from the battery 19 is supplied (applied) to the intermediate cylinder 15. Accordingly, a potential difference occurs within the passage 16 between the inner cylinder 2 and the intermediate cylinder 15 according to the voltage applied to the intermediate cylinder 15, and the viscosity of the working fluid 20 (i.e., the electrorheological fluid) is variably controlled according to the potential difference.

As a result, the shock absorber 1 may continuously regulate a characteristic (a damping force characteristic) of the generated damping force from a hard characteristic (a hard characteristic) to a soft characteristic (a soft characteristic) according to the voltage applied to the intermediate cylinder 15. The shock absorber 1 does not need to necessarily continuously change the damping force characteristic, but may be configured to perform regulation in, for example two stages or a plurality of stages. In this manner, the shock absorber 1 is configured to variably control (regulate) the generated damping force by generating a potential difference within the passage 16 between the inner cylinder 2 and the intermediate cylinder 15, and controlling the viscosity of the electrorheological fluid passing through the passage 16.

Next, descriptions will be made on the operations of the shock absorber 1 according to the exemplary embodiment which is configured as described above described configuration.

When the shock absorber 1 is mounted on a vehicle such as an automobile, for example, the upper end (the protrusion end) side of the piston rod 8 is mounted on the vehicle body side of the vehicle, and the lower end side (e.g., a mounting eye on the bottom cap 4 side) of the outer cylinder 3 is mounted on the vehicle wheel side (the axle side). During the traveling of the vehicle, when upward/downward vibrations occur due to the unevenness or the like of the road surface, the piston rod 8 is displaced to extend/retract from the outer cylinder 3. Here, a potential difference occurs within the passage 16 between the inner cylinder 2 and the intermediate cylinder 15, based on a command from the controller, and the viscosity of the working fluid 20 (i.e., the electrorheological fluid) passing through the passage 16 is variably controlled so that the generated damping force of the shock absorber 1 is variably regulated.

For example, at the extension stroke of the piston rod 8, the piston 5 moves upward within the inner cylinder 2, and the retraction side check valve 6 of the piston 5 is closed. Thus, the working fluid 20 of the rod side oil chamber B is pressurized, flows into the passage 16 through the oil hole 2A of the inner cylinder 2, and flows from the lower end side of the passage 16 to the reservoir chamber A. Here, the working fluid 20 flows into and replenish the bottom side oil chamber C of the inner cylinder 2 from the reservoir chamber A via the bottom valve 12.

Meanwhile, at the retraction stroke of the piston rod 8, the piston 5 moves downward within the inner cylinder 2, and the retraction side check valve 6 of the piston 5 is opened. Here, since the bottom valve 12 is substantially closed, the oil liquid of the bottom side oil chamber C flows into the rod side oil chamber B through the oil passages 5A of the piston 5. Thus, the working fluid 20 corresponding to an entry volume when the piston rod 8 enters into the inner cylinder 2 at the retraction stroke flows into the passage 16 from the rod side oil chamber B through the oil hole 2A of the inner cylinder 2.

In this manner, at both the extension stroke and retraction stroke of the piston rod 8, the working fluid 20 that has flowed into the passage 16 flows within the passage 16 toward an outlet side (i.e., the oil passages 13A side of the holding member 13) with a viscosity depending on a potential difference between the inner cylinder 2 and the intermediate cylinder 15 (i.e., within the passage 16), and flows out to the reservoir chamber A. Here, the working fluid 20 passing through the inside of the passage 16 may generate a damping force depending on the viscosity thereof (i.e., a viscous resistance), and the shock absorber 1 may buffer (dampen) the upward/downward vibration of the vehicle.

Meanwhile, the inner cylinder 2 and the intermediate cylinder 15 are disposed between the rod guide 9 and the valve body 12A of the bottom valve 12 to extend in the axial direction. In order to impart an axial fastening force to the inner cylinder 2 and the intermediate cylinder 15 between the rod guide 9 and the valve body 12A, it is required to strictly manage a dimensional tolerance in the axial direction in each of the inner cylinder 2 and the intermediate cylinder 15, and it becomes difficult to manage the dimensions. Thus, when an attempt is made to position only the inner cylinder 2 between the rod guide 9 and the valve body 12A in the axial direction, there is a possibility that the positionability of the intermediate cylinder 15 may deteriorate, and the working fluid within the intermediate cylinder 15 (i.e., the passage 16) may leak to, for example, the reservoir chamber A side.

Accordingly, the first exemplary embodiment employs a configuration in which the upper end side of the intermediate cylinder 15 is mounted to the rod guide 9 via the spacer 17, and the elastic seal member 18 that seals the upper end side of the passage 16 between the inner cylinder 2 and the intermediate cylinder 15 is provided at the lower end side of the spacer 17. That is, the spacer 17 is fitted to the outer peripheral surface of the inner cylinder 2, and the upper cylinder portion 17A is fitted to the annular step 9C of the rod guide. The diameter-enlarged cylinder portion 15C of the intermediate cylinder 15 is fitted and mounted to the lower cylinder portion 17B below the flange portion 17C.

Accordingly, the gap S may be formed between the flange portion 17C of the spacer 17 and the upper end of the diameter-enlarged cylinder portion 15C, as illustrated in FIG. 3, and the intermediate cylinder 15 (the upper diameter-enlarged cylinder portion 15C) may be fitted and mounted to the lower cylinder portion 17B of the spacer 17 so as to be relatively movable within the range of the gap S in the axial direction. Thus, there is no need to strictly manage the axial dimension of the intermediate cylinder 15, and thus it is possible to improve the workability and the productivity in manufacturing the intermediate cylinder 15.

At the upper end side of the intermediate cylinder 15, the diameter-enlarged cylinder portion 15C, the diameter of which is enlarged radially outward, is formed, below which the tapered inclined cylinder portion 15B serving as a pressure receiving face of a pressure is formed. Thus, the pressure of the working fluid 20, which becomes the highest pressure within the passage 16, is received by the inclined cylinder portion 15B, and then a pressing force in the arrow F direction is caused to occur in the intermediate cylinder 15 so that the force may be accepted by the holding member 13 side. As a result, in the intermediate cylinder 15, the intermediate cylinder 15 may be positioned between the rod guide 9 and the valve body 12A with a pressing force (a fastening force) in the axial direction in a state where the gap S (see FIG. 3) is left between the flange portion 17C of the spacer 17 and the diameter-enlarged cylinder portion 15C, so that the positioning accuracy of the intermediate cylinder 15 may be secured.

In a configuration, the seal holding portion 17D is provided at the lower cylinder portion 17B of the spacer 17 arranged by being sandwiched between the diameter-enlarged cylinder portion 15C of the intermediate cylinder 15 and the inner cylinder 2, and the elastic seal member 18 is provided in the seal holding portion 17D to seal one end (the upper end side) of the passage 16, between the inner cylinder 2 and the intermediate cylinder 15. The seal member 18 includes the first seal portion 18A configured to seal a gap between the inner cylinder 2 and the seal holding portion 17D of the spacer 17, and the second seal portion 18I configured to seal a gap between the diameter-enlarged cylinder portion 15C of the intermediate cylinder 15 and the seal holding portion 17D of the spacer 17.

Accordingly, it is possible to prevent the leakage of the working fluid 20 within the passage 16 from the spacer 17 side between the inner cylinder 2 and the intermediate cylinder 15 to the outside, by the seal member 18. Further, when the pressure of the passage 16 (i.e., the pressure of the working fluid 20) acts in the intermediate cylinder 15, the spacer 17 receives an upward pressing force, and thus hits the annular step 9C of the rod guide 9. The spacer 17 may be positioned with respect to the rod guide 9 with an axial fastening force.

In this manner, according to the first exemplary embodiment, the diameter-enlarged cylinder portion 15C of the intermediate cylinder 15 is fitted to the lower cylinder portion 17B of the spacer 17 from the outside, and has an inner diameter (a diameter) larger than the cylinder portion 15A of the intermediate cylinder 15 located at the downstream side of the fitting portion in the passage 16. The outer diameter of the spacer 17 (the lower cylinder portion 17B) is slightly smaller than the inner diameter of the intermediate cylinder 15 (the diameter-enlarged cylinder portion 15C), and the inner diameter of the spacer 17 is slightly larger than the outer diameter of the inner cylinder 2 so that the spacer 17 may be relatively movable with respect to the inner cylinder 2 and the intermediate cylinder 15. In a configuration, at the lower cylinder portion 17B of the spacer 17, the seal holding portion 17D is provided on which the seal member 18 is provided to seal the pressure within the intermediate cylinder 15.

Accordingly, when the pressure of the passage 16 (i.e., the pressure of the working fluid 20) acts in the intermediate cylinder 15, the spacer 17 receives an upward pressing force, and thus hits the annular step 9C of the rod guide 9 so that the spacer 17 may be positioned with respect to the rod guide 9 with an axial fastening force, that is, an axial force. At the same time, in the intermediate cylinder 15, the inclined cylinder portion 15B serving as a pressure receiving face of the diameter-enlarged cylinder portion 15C receives a downward pressure (i.e., the pressure of the working fluid 20), and thus the lower end side (the lower diameter-enlarged cylinder portion 15D) of the intermediate cylinder 15 hits the step portion 12B of the valve body 12A via the holding member 13 so that the intermediate cylinder 15 may be positioned with respect to the valve body 12A with an axial fastening force.

The spacer 17 has a flange portion 17C that protrudes radially outward at the upper side of the lower cylinder portion 17B to which the diameter-enlarged cylinder portion 15C of the intermediate cylinder 15 is fitted, and has an outer diameter larger than an inner diameter of the intermediate cylinder 15 (the diameter-enlarged cylinder portion 15C). Thus, when the spacer 17 is assembled such that the lower cylinder portion 17B of the spacer 17 is sandwiched between the diameter-enlarged cylinder portion 15C of the intermediate cylinder 15 and the inner cylinder 2, it is possible to suppress the spacer 17 from unnecessarily intruding into the intermediate cylinder 15 by the flange portion 17C.

Therefore, according to the first exemplary embodiment, when the above described configuration is employed, the inner cylinder 2 may be positioned in the axial direction between the rod guide 9 and the bottom valve 12 (the valve body 12A). The intermediate cylinder 15 may be positioned in the axial direction by being caused to hit the holding member 13 and the valve body 12A, and also may be positioned in the axial direction using the spacer 17 and the seal member 18. Then, the intermediate cylinder 15 may be suppressed from axially playing or being misaligned to a vibration or the like from the outside. Further, it is possible to prevent leakage of the working fluid 20 within the intermediate cylinder 15 to the outside of the passage 16, by the seal member 18 and the spacer 17.

Figure 4:
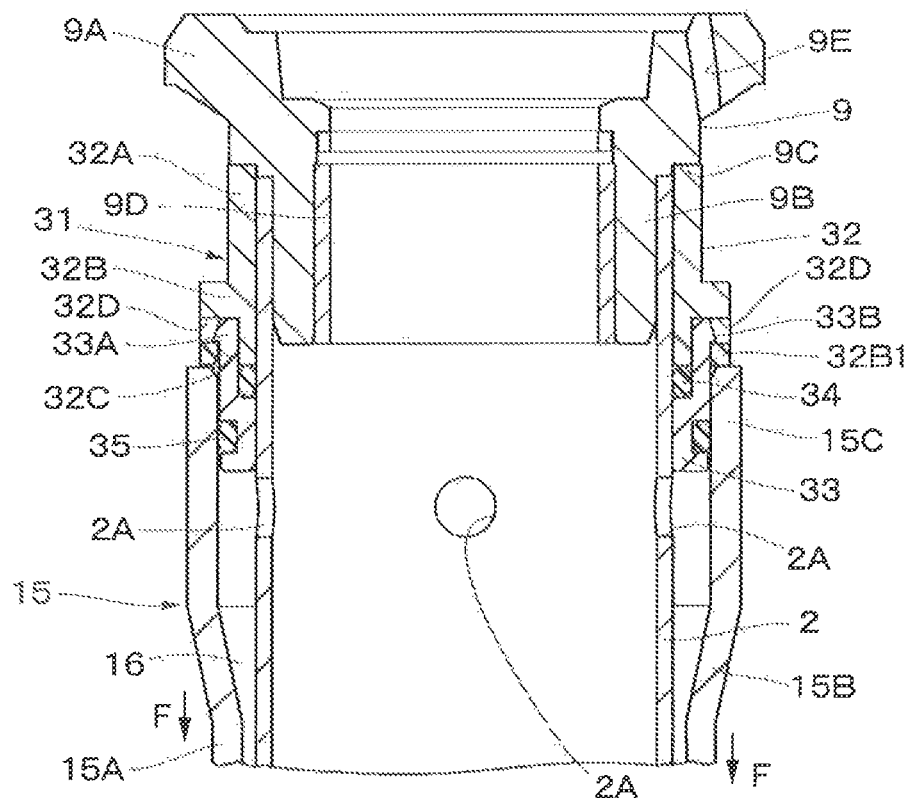
FIG. 4 is a sectional view illustrating a mounting portion of a rod guide, an inner cylinder, and an intermediate cylinder in a second exemplary embodiment, in an enlarged state.
Figure 5:
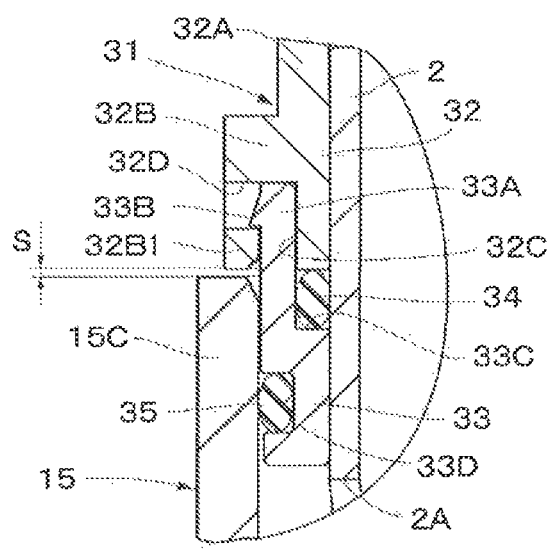
FIG. 5 is a sectional view illustrating a seal member, a lower end side of a spacer, and the like in FIG. 4, in an enlarged state.
Figure 6:
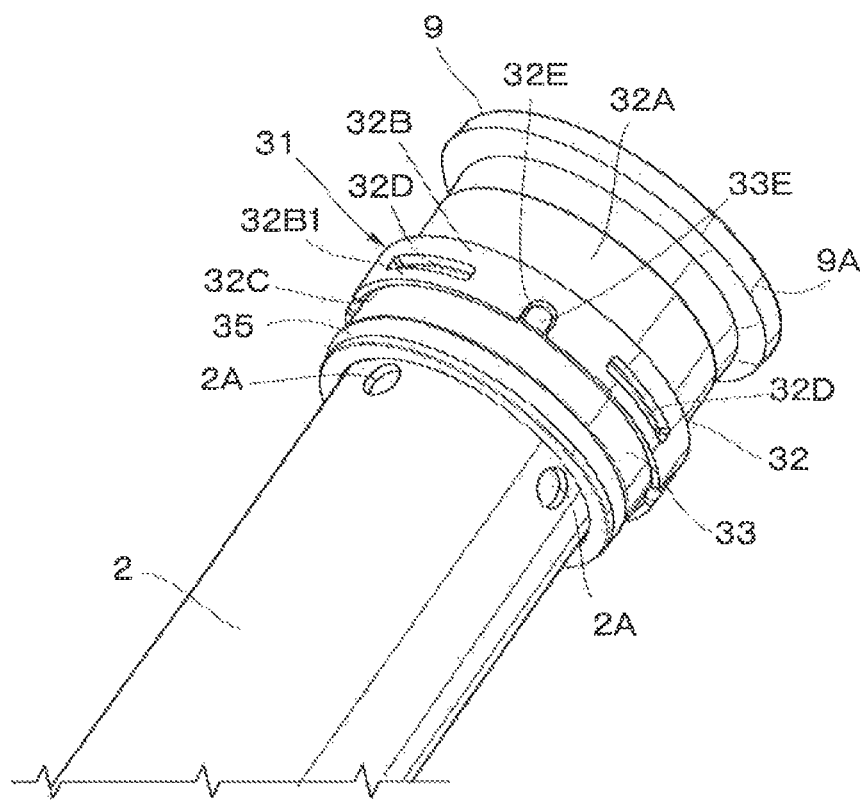
FIG. 6 is a partial perspective view illustrating a mounting portion of the rod guide, the inner cylinder, and the spacer in FIG. 4.

Then, FIGS. 4 to 6 illustrate a second exemplary embodiment of the present invention. The present exemplary embodiment is characterized in that a gap between the inner cylinder, the spacer, and the intermediate cylinder is configured to be sealed by a highly versatile seal member. In the second exemplary embodiment, the same reference numerals are given to the same constituent elements as those in the above described first exemplary embodiment, and descriptions thereof will be omitted.

A spacer 31 employed in the second exemplary embodiment is formed by being divided into two portions, i.e. an upper spacer 32 as a spacer of one side and a lower spacer 33 as a spacer of the other side. Similarly to the spacer 17 described above in the first exemplary embodiment, the upper spacer 32 is constituted by an upper cylinder portion 32A and a lower cylinder portion 32B. However, in this case, the lower cylinder portion 32B is formed to be shorter than the lower cylinder portion 17B described in the first exemplary embodiment. That is, the lower cylinder portion 32B is disposed at a location above the diameter-enlarged cylinder portion 15C of the intermediate cylinder 15, and a gap S is formed between a lower end 32B1 of the lower cylinder portion 32B and the upper end of the diameter-enlarged cylinder portion 15C, as illustrated in FIG. 5.

The lower cylinder portion 32B of the upper spacer 32 is formed to be thicker than the upper cylinder portion 32A (to have a larger radial dimension). The outer periphery side of the lower cylinder portion 32B constitutes a flange portion in the spacer 31. An annular mounting hole 32C having an opened lower side and a closed upper side is provided in the lower cylinder portion 32B. The annular mounting hole 32C is formed as a ring-shaped recess (a bottomed hole) that extends over the entire circumference of the lower cylinder portion 32B. The annular mounting hole 32C is a mounting hole through which the lower spacer 33 is mounted to the upper spacer 32, and both are integrally assembled.

Here, a plurality of openings 32D constituted by elongated holes extending in the radial direction of the annular mounting hole 32C and extending in the circumferential direction are formed in the lower cylinder portion 32B. Each of the openings 32D is opened at the outer peripheral surface of the lower cylinder portion 32B as illustrated in FIG. 6. On the outer periphery side of the lower cylinder portion 32B, a substantially U-shaped notch 32E is formed at a location between the respective openings 32D, and each notch 32E communicates with the annular mounting hole 32C in the radial direction of the lower cylinder portion 32B. Such a notch 32E is engaged with a positioning protrusion 33E to be described below, by which the upper spacer 32 and the lower spacer 33 are suppressed from being rotated.

The lower spacer 33 is formed as a short cylinder body that is loosely fitted to a gap between the diameter-enlarged cylinder portion 15C of the intermediate cylinder 15 and the inner cylinder 2. An annular protrusion 33A extending toward the inside of the annular mounting hole 32C of the upper spacer 32 is integrally formed at the upper end side of the lower spacer 33. On the upper end side outer periphery of the annular protrusion 33A, a plurality of hook portions 33B are provided to be locked to the lower end 32B1 side of the lower cylinder portion 32B via the respective openings 32D. This suppresses the lower spacer 33 from slipping out of the upper spacer 32 in the axial direction.

At the inner periphery side of the lower spacer 33, an annular seal groove 33C is formed at a location between the lower end side inner periphery of the annular protrusion 33A and the lower end face of the upper spacer 32. An O ring 34 as a seal member is mounted in the seal groove 33C, and the O ring 34 constitutes a first seal portion to seal a gap between the inner cylinder 2 and the spacer 31. At the outer periphery side of the lower spacer 33, another annular seal groove 33D) is formed at a location below the annular protrusion 33A in the axial direction, and an O ring 35 as a seal member is mounted in the seal groove 33C. The O ring 35 constitutes a second seal portion to seal a gap between the intermediate cylinder 15 and the spacer 31.

The positioning protrusion 33E is provided on the outer periphery side of the lower spacer 33, as illustrated in FIG. 6, and the positioning protrusion 33E is formed as a protrusion in a substantially U shape. Then, the positioning protrusion 33E is detachably engaged with the notch 32E of the upper spacer 32, by which the lower spacer 33 is maintained in a rotation-suppressed state with respect to the upper spacer 32. That is, the lower spacer 33 is suppressed from slipping out of the lower cylinder portion 32B of the upper spacer 32 in the axial direction by the hook portions 33B of the annular protrusion 33A, and is suppressed from rotating with respect to the notch 32E of the upper spacer 32 in the circumferential direction by the positioning protrusion 33E.

In this manner, in the second exemplary embodiment configured as described above as well, the intermediate cylinder 15 may be positioned in the axial direction using the spacer 31 constituted by the upper spacer 32 and the lower spacer 33 and the O rings 34 and 35 in the same manner as in the first exemplary embodiment, and the intermediate cylinder 15 may be suppressed from axially playing or being misaligned due to a vibration or the like from the outside. Further, it is possible to prevent leakage of the working fluid 20 within the intermediate cylinder 15 to the outside of the passage 16, by the O rings 34 and 35.

Particularly, in the second exemplary embodiment, the spacer 31 is formed to be divided into two portions, i.e. an upper spacer 32 and a lower spacer 33, and thus it is possible to easily perform molding and processing of the upper spacer 32 and the lower spacer 33, and to simplify the structure of, for example, a molding die. As a seal member, the highly versatile O rings 34 and 35 may be used, and the leakage of the working fluid 20 may be suppressed through a simple structure.

In the second exemplary embodiment, descriptions have been made on a case where the spacer 31 is formed to be divided into two portion, i.e. the upper spacer 32 and the lower spacer 33, as an example. However, the present invention is not limited thereto, but it may be possible to employ a configuration in which the upper spacer 32 and the lower spacer 33 are made as an integrated object in advance, and the spacer 31 is integrally molded. Accordingly, in this case, the annular mounting hole 32C, the opening 32D, and the notch 32E of the upper spacer 32, and the annular protrusion 33A, the hook portion 33B, and the positioning protrusion 33E of the lower spacer 33 and the like may become unnecessary and may be omitted.

In the first exemplary embodiment, descriptions have been made on a case where the seal member 18 is configured by a seal having a U-shaped cross-section (for example, a U packing) and formed of a first seal portion 18A, a second seal portion 18B, and a connecting portion 18C, as an example. However, it may be possible to employ a configuration in which, for example, two rings are used instead of the seal member 18.

In each of the exemplary embodiments described above, descriptions have been made on a case where the working fluid 20 as the functional fluid is composed of an electrorheological fluid, as an example. However, the present invention is not limited thereto, but the working fluid as the functional fluid may be composed of, for example, a magnetic fluid (an MR fluid). In the case where the magnetic fluid is used, it may be possible to employ a configuration in which, for example, the magnetic field may be generated between the inner cylinder 2 and the intermediate cylinder 15, and the magnetic field may be variably controlled from the outside in order to variably regulate the generated damping force. The holding member 13, the spacer 17(31), and the like for insulating may be made of a nonmagnetic material.

In each of the exemplary embodiments described above, descriptions have been made on of a case where the shock absorber 1 as a cylinder device is used for a four-wheeled vehicle, as an example. However, without being limited thereto, the present invention may be widely used as various shock absorbers (cylinder devices) such as, for example, a shock absorber used for a two-wheeled vehicle, a shock absorber used for various mechanical devices including general industrial equipment, a shock absorber used for buildings, etc.

Hereinafter, descriptions will be made on aspects included in each of the exemplary embodiments. That is, in a configuration, a diameter-enlarged cylinder portion, the diameter of which is enlarged radially outward via an annular stepped portion, is provided at one end side of an intermediate cylinder, and the diameter-enlarged cylinder portion is fitted to the outer periphery side of the other end of the spacer. Accordingly, the stepped portion of the intermediate cylinder becomes a pressure receiving face that receives a fluid pressure within a passage, and the intermediate cylinder may be pressed toward a base member side by the pressure received by the stepped portion. The intermediate cylinder is held while pressed downward against the base member side (i.e., the holding member 13 and the step portion 12B of the valve body 12A at the lower side.).

The other end of the spacer extends to a gap between the intermediate cylinder and the inner cylinder, and the seal member has a first seal portion between the inner cylinder and the spacer, and a second seal portion between the intermediate cylinder and the spacer. The first seal portion may be integrated with the second seal portion.

The spacer is provided to be relatively movable with respect to the intermediate cylinder in the axial direction.

Accordingly, the other end side of the spacer may be loosely fitted and mounted between the outer peripheral surface of the inner cylinder and the inner peripheral surface of the intermediate cylinder, and the seal member may abut on both fitting portions, in an elastically deformed state with a margin. For example, the first seal portion and the second seal portion of the seal member may be brought into abutment in an elastically deformed state with a margin between the inner cylinder and the spacer, and between the intermediate cylinder and the spacer. Thus, the seal member in the elastically deformed state may impart a pull-out prevention performance and a sealing performance to both fitting portions.

In a configuration, a flange portion is provided at a position not abutting on one end of the intermediate cylinder, at the outer periphery side of the spacer. Accordingly, a gap may be formed between the flange portion of the spacer and the upper end of the intermediate cylinder, and the intermediate cylinder may be fitted and mounted to the spacer to be relatively movable within the range of the gap in the axial direction. Thus, there is no need to strictly manage the axial dimension of the intermediate cylinder, and thus it is possible to improve the workability and the productivity in manufacturing the intermediate cylinder.

As a cylinder device based on the exemplary embodiment described above, for example, the following aspects may be presented. A cylinder device according to a first aspect includes: an inner cylinder in which a functional fluid, a fluid property of which is changed due to an electric field or a magnetic field, is encapsulated, and into which a rod is inserted; an outer cylinder provided outside the inner cylinder; an intermediate cylinder provided between the inner cylinder and the outer cylinder such that a passage in which the functional fluid flows from one end side of the cylinder device toward the other end side in an axial direction due to advancing and retracting movements of the rod is formed between the inner cylinder and the intermediate cylinder, and configured to serve as an electrode or a magnetic pole; a rod guide provided to close the one end side end portions of the inner cylinder and the outer cylinder, and configured to support the rod; a spacer having one end located at the rod guide side and the other end located at the one end side of the intermediate cylinder, and fitted to the inner cylinder; and an elastic seal member disposed in a portion of the other end of the spacer, and configured to seal the one end side end portion of the passage between the intermediate cylinder and the inner cylinder.

According to a second aspect, in the first aspect, the intermediate cylinder includes a diameter-enlarged cylinder portion a diameter of which is enlarged radially outward via an annular stepped portion, at the one end side of the intermediate cylinder, and the diameter-enlarged cylinder portion is fitted to an outer periphery of the other end of the spacer.

According to a third aspect, in the first or second aspect, the other end of the spacer extends to a location between the intermediate cylinder and the inner cylinder, and the seal member includes a first seal portion between the inner cylinder and the spacer, and a second seal portion between the intermediate cylinder and the spacer.

According to a fourth aspect, in the third aspect, the first seal portion and the second seal portion are integrated with each other.

According to a fifth aspect, in any one of first to fourth aspects, the spacer is provided to be relatively movable with respect to the intermediate cylinder in an axial direction.

According to a sixth aspect, in any one of first to fifth aspects, the spacer includes a flange portion at a position where the flange portion does not abut on the one end side end portion of the intermediate cylinder in an outer periphery of the spacer.

In the foregoing, several exemplary embodiments of the present invention have been described above in order to facilitate understanding of the present invention without limiting the present invention. The present invention may be changed or improved without departing from the idea thereof, and of course, the equivalents of the present invention are included in the present invention. It is possible to arbitrarily combine or omit respective constituent elements described in the claims and specification in a range in which at least a part of the above described problems can be solved, or a range in which at least a part of the effects can be exhibited.

This application claims priority based on Japanese Patent Application No. 2015-192849 filed on Sep. 30, 2015. All disclosures, including the specification, claims, drawings and abstract of Japanese Patent Application No. 2015-192849 filed on Sep. 30, 2015, are hereby incorporated by reference in their entirety.

DESCRIPTION OF SYMBOLS

1: shock absorber (cylinder device), 2: inner cylinder, 3: outer cylinder, 4: bottom cap (base member), 5: piston, 8: piston rod (rod), 9: rod guide, 12: bottom valve, 12A: valve body (base member), 13: holding member, 15: intermediate cylinder, 15B: inclined cylinder portion (stepped portion), 15C: diameter-enlarged cylinder portion, 16: passage, 17, 31: spacer, 18: seal member, 18A: first seal portion, 18B: second seal portion, 20: working fluid (functional fluid), 32: upper spacer (one side spacer), 32B: lower cylinder portion (flange portion), 33: lower spacer (the other side spacer), 34: O ring (seal member, first seal portion), 35: O ring (seal member, second seal portion)

What is claimed is:
1. A cylinder device comprising:
an inner cylinder in which a functional fluid, a fluid property of which is changed due to an electric field or a magnetic field, is encapsulated, and into which a rod is inserted;
an outer cylinder provided outside the inner cylinder;
an intermediate cylinder provided between the inner cylinder and the outer cylinder such that a passage in which the functional fluid flows from one end of the cylinder device toward the other end in an axial direction due to advancing and retracting movements of the rod is formed between the inner cylinder and the intermediate cylinder, and configured to serve as an electrode or a magnetic pole;
a rod guide provided to close end portions of the inner cylinder and the outer cylinder, and configured to support the rod;
a spacer having one end located at the rod guide and the other end located at one end of the intermediate cylinder and fitted to the inner cylinder; and
an elastic seal member disposed on the other end of the spacer, and the elastic seal member configured to seal one end portion of the passage between the intermediate cylinder and the inner cylinder,
wherein the spacer is provided to be relatively movable with respect to the intermediate cylinder in an axial direction.

2. The cylinder device of claim 1, wherein the intermediate cylinder includes a diameter-enlarged cylinder portion a diameter of which is enlarged radially outward via an annular stepped portion, at one end of the intermediate cylinder, and the diameter-enlarged cylinder portion is fitted to an outer periphery of the other end of the spacer.

3. The cylinder device of claim 2, wherein the other end of the spacer extends to a location between the intermediate cylinder and the inner cylinder, and the seal member includes a first seal portion between the inner cylinder and the spacer, and a second seal portion between the intermediate cylinder and the spacer.

4. The cylinder device of claim 3, wherein the first seal portion and the second seal portion are integrated with each other.

5. The cylinder device of claim 1, wherein the other end of the spacer extends to a location between the intermediate cylinder and the inner cylinder, and the seal member includes a first seal portion between the inner cylinder and the spacer, and a second seal portion between the intermediate cylinder and the spacer.

6. The cylinder device of claim 5, wherein the first seal portion and the second seal portion are integrated with each other.

7. The cylinder device of claim 1, wherein the spacer includes a flange portion at a position where the flange portion does not abut the one end of the intermediate cylinder, the flange portion being located on an outer periphery of the spacer.

* * * * *